United States Patent
Novak et al.

(10) Patent No.: US 11,000,063 B2
(45) Date of Patent: May 11, 2021

(54) PACKAGING WITH AN INFORMATION ENCODING PATTERN

(71) Applicant: REEMTSMA CIGARETTENFABRIKEN GMBH, Hamburg (DE)

(72) Inventors: Slavomir Novak, Hamburg (DE); Claas Gerding-Reimers, Hamburg (DE)

(73) Assignee: REEMTSMA CIGARETTENFABRIKEN GMBH

( * ) Notice: Subject to any disclaimer, the term of this patent is extended or adjusted under 35 U.S.C. 154(b) by 279 days.

(21) Appl. No.: 16/066,367

(22) PCT Filed: Jan. 5, 2017

(86) PCT No.: PCT/EP2017/050172
§ 371 (c)(1),
(2) Date: Jun. 27, 2018

(87) PCT Pub. No.: WO2017/118677
PCT Pub. Date: Jul. 13, 2017

(65) Prior Publication Data
US 2019/0021393 A1    Jan. 24, 2019

(30) Foreign Application Priority Data
Jan. 8, 2016    (EP) .................................... 16150646

(51) Int. Cl.
*A24F 15/08*    (2006.01)
*B65D 85/10*    (2006.01)
(Continued)

(52) U.S. Cl.
CPC ................ *A24F 15/08* (2013.01); *A24F 9/16* (2013.01); *B42D 25/378* (2014.10); *B65D 85/10* (2013.01);
(Continued)

(58) Field of Classification Search
CPC .......... G06K 7/089; G06K 7/081; G06K 7/08; G06K 9/0002; A24F 15/08; B65D 85/1081; B65D 85/10; B42D 25/378; G06F 3/044
See application file for complete search history.

(56) References Cited

U.S. PATENT DOCUMENTS 5,987,850 A * 11/1999 Schoch ................. B65C 9/0015
53/415
9,423,325 B2 * 8/2016 Enomoto ................. G01N 1/06
(Continued)

FOREIGN PATENT DOCUMENTS

DE    20 2011 106743 U1    4/2012
EP         1 459 988 A1    9/2004
(Continued)

OTHER PUBLICATIONS

International Search Report dated Feb. 16, 2017, mailed Feb. 23, 2017.
(Continued)

*Primary Examiner* — Daniel I Walsh
(74) *Attorney, Agent, or Firm* — Norris McLaughlin, P.A.

(57) ABSTRACT

There is provided a package for tobacco products or tobacco related commodities or smoking devices (20; 120; 220; 320), wherein the package (20; 120; 220; 320) includes an information encoding pattern (10; 110). The information encoding pattern comprises at least one first area (12) having a first conductive or dielectric property and at least one second area (14; 14*a*, 14*b*, 14*c*) having a second conductive or dielectric property. The first conductive property is different from the second conductive property and the first dielectric property is different from the second dielectric property. The information encoding pattern is configured to be detectable by a capacitive touch screen (24), e.g. a touch screen of a mobile device (22), such as a smartphone or
(Continued)

tablet computer, when the information encoding pattern interacts with the touch screen, i.e. when the information encoding pattern approaches and/or touches the touch screen.

15 Claims, 5 Drawing Sheets

(51) Int. Cl.
    *B42D 25/378*     (2014.01)
    *A24F 9/16*     (2006.01)
    *G06F 3/044*     (2006.01)
    *G06K 7/08*     (2006.01)
    *G06K 9/00*     (2006.01)

(52) U.S. Cl.
    CPC ......... *B65D 85/1081* (2013.01); *G06F 3/044* (2013.01); *G06K 7/08* (2013.01); *G06K 9/0002* (2013.01); *B65D 2203/00* (2013.01); *B65D 2203/10* (2013.01); *B65D 2401/00* (2020.05)

(56) References Cited

U.S. PATENT DOCUMENTS

| | | | |
|---|---|---|---|
| 9,589,161 B1* | 3/2017 | Lau | G06Q 20/34 |
| 9,977,547 B1* | 5/2018 | Sloo | G06F 3/044 |
| 10,248,820 B2* | 4/2019 | Allen | G06F 1/1637 |
| 10,686,963 B1* | 6/2020 | Rodriguez | H04N 1/32261 |
| 2002/0188259 A1* | 12/2002 | Hickle | G06K 19/0723 604/189 |
| 2003/0176775 A1* | 9/2003 | Berman | A61B 5/14532 600/310 |
| 2004/0222302 A1* | 11/2004 | Matsumori | G06K 7/10851 235/472.01 |
| 2005/0011163 A1* | 1/2005 | Ehrensvard | G06K 19/07798 53/410 |
| 2005/0022470 A1 | 2/2005 | Focke et al. | |
| 2005/0051624 A1* | 3/2005 | Kipp | B65D 51/24 235/385 |
| 2005/0184871 A1* | 8/2005 | Coste | B65D 5/4212 340/568.2 |
| 2005/0225445 A1* | 10/2005 | Petersen | B65D 5/42 340/568.2 |
| 2005/0275537 A1* | 12/2005 | Kerr | G08B 13/126 340/568.2 |
| 2006/0180661 A1* | 8/2006 | Grant | G06Q 30/06 235/382 |
| 2007/0057054 A1 | 3/2007 | Maranov | |
| 2007/0251989 A1* | 11/2007 | Grossman | A63F 3/065 235/375 |
| 2007/0296599 A1* | 12/2007 | Wang | B65D 55/028 340/572.8 |
| 2009/0134230 A1 | 5/2009 | Stojak et al. | |
| 2009/0295144 A1* | 12/2009 | Winkelhorn | B42D 25/333 283/94 |
| 2009/0302111 A1* | 12/2009 | Woodard | G08B 13/2408 235/449 |
| 2012/0125993 A1* | 5/2012 | Thiele | B42D 25/47 235/375 |
| 2013/0194192 A1* | 8/2013 | Andolina | G06F 3/0416 345/173 |
| 2013/0314375 A1* | 11/2013 | Rickstrom | G06F 3/03 345/174 |
| 2014/0111469 A1* | 4/2014 | Foerster | G06F 3/0393 345/174 |
| 2014/0192016 A1* | 7/2014 | Yoshino | G06F 3/0488 345/174 |
| 2015/0213734 A1* | 7/2015 | Glickman | G09F 3/005 235/494 |
| 2015/0227925 A1* | 8/2015 | Filler | G06Q 20/32 382/100 |
| 2015/0310453 A1* | 10/2015 | Kolton | G06Q 30/0185 235/380 |
| 2015/0353236 A1* | 12/2015 | Gentile | G06Q 10/087 235/375 |
| 2015/0356326 A1* | 12/2015 | Thiele | G06K 7/081 235/451 |
| 2018/0129832 A1* | 5/2018 | Keller | G06K 7/081 |
| 2018/0136776 A1* | 5/2018 | Xie | G06F 3/0446 |
| 2018/0332142 A1* | 11/2018 | Ashby | G06K 7/10821 |
| 2019/0021393 A1* | 1/2019 | Novak | A24F 9/16 |
| 2019/0130146 A1* | 5/2019 | Isom | G06K 7/10366 |
| 2020/0252105 A1* | 8/2020 | Hofmann | G06K 19/07707 |

FOREIGN PATENT DOCUMENTS

| | | |
|---|---|---|
| EP | 2 418 607 A1 | 5/2012 |
| ES | 2 464 873 A2 | 6/2014 |
| JP | 2012062094 A * | 3/2012 |

OTHER PUBLICATIONS

European Extended Search Report dated May 18, 2016.
Office Action dated Sep. 24, 2019, in connection with Japanese Patent Application No. 2018-535357.

* cited by examiner

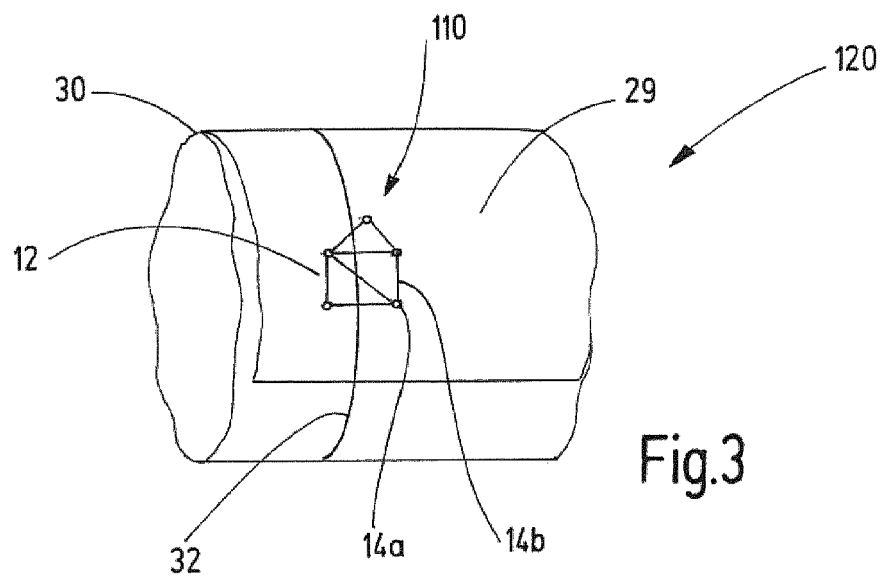
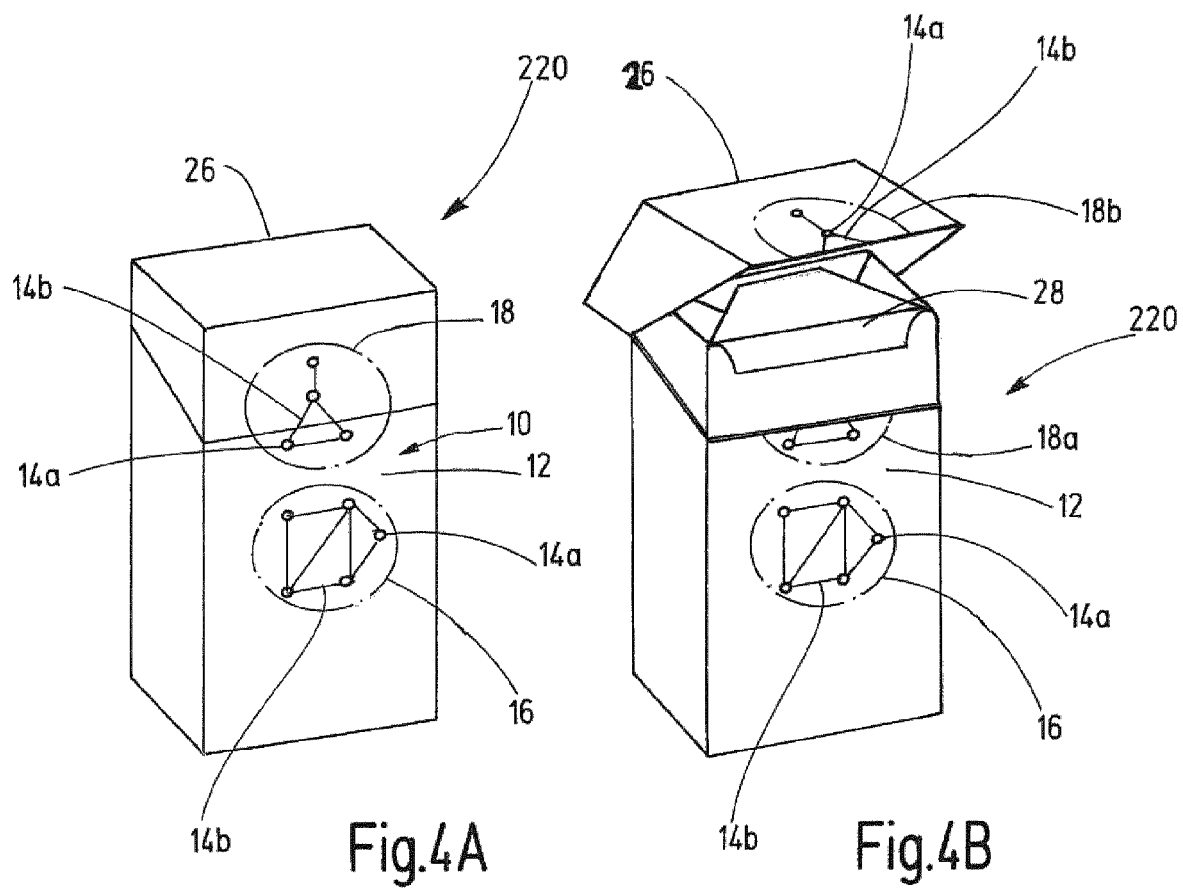

PACKAGING WITH AN INFORMATION ENCODING PATTERN

This application is the U.S. National Stage of International Application No. PCT/EP2017/050172, filed Jan. 5, 2017, which claims foreign priority benefit under 35 U.S.C. § 119 of European Application No. 16150646.4 filed Jan. 8, 2016.

The present invention relates generally to a package for smokeable or non-smokeable tobacco products, in particular raw tobacco, cigarettes or snus, or smokeable or non-smokeable tobacco related commodities, in particular cigarette paper, filters, tubes or filter tubes for cigarettes, or electronic or non-electronic smoking devices, in particular electronic cigarettes or aerosol-generating devices, wherein the package includes an information encoding pattern. The invention further relates to a method of producing such a package, a system comprising such a package, and a consumer communication method in connection with such a package.

Packaging tobacco products or tobacco related commodities or smoking devices in particular into bags, folding boxes and cans is known. The known packages can e.g. have closures in the form of pivotal or detachable caps, inner parts which can be drawn out or swung out, or detachable can lids.

It is known in the art to provide a tobacco product packaging with a security element. An electronic security element, e.g. an RFID tag, can, on the one hand, support electronic article surveillance. On the other hand, an RFID tag can serve as a security element proving the authenticity or genuineness of the product. In this context, also non-electronic security elements are known, such as holograms or the like. Alternatively, a security element can be used as a seal, indicating whether or not the respective packaging has been tampered with, in particular, whether or not the package has already been opened. To that end, it has been suggested to arrange an RFID tag on the packaging so that an antenna and/or chip of the RFID tag is destroyed if the packaging is tampered with or opened. In other words, the RFID tag is then deactivated and can no longer be used as an authenticity feature.

It is an object of the present invention to suggest a package for tobacco products or tobacco related commodities or smoking devices providing reliable protection against forgery at low cost as well as enhanced usability.

This object is solved by a package for tobacco products or tobacco related commodities or smoking devices, a method of producing same, a system, and a consumer communication method with the features defined in the independent claims. Preferred embodiments and enhancements are defined in the dependent claims.

In accordance with one aspect of the present invention there is provided a package for tobacco products or tobacco related commodities or smoking devices, which package includes an information encoding pattern. The information encoding pattern comprises at least one first area having a first conductive or dielectric property and at least one second area having a second conductive or dielectric property. The first conductive property is different from the second conductive property, and the first dielectric property is different from the second dielectric property. The information encoding pattern is configured to be detectable by a capacitive touch screen, e.g. a touch screen of a mobile device, such as a smartphone or tablet computer, when the information encoding pattern interacts with the touch screen, i.e. when the information encoding pattern approaches and/or touches the touch screen. The detection of the pattern is based on the differences in the dielectric or conductive properties of the first area and second area, which differences can be sensed by the capacitive touch screen. A well known dielectric property in the present context is permittivity (the measure of resistance that is encountered when forming an electric field in a medium); a well known conductive property is conductivity (a measure of a material's ability to conduct an electric current). A similar technology has been suggested in US 2014/0111469 A1.

In general, the information encoding pattern encodes at least one identifier uniquely identifying the package, e.g. as authenticity feature. Alternatively or additionally, as described below in detail, the information encoding pattern can be provided to encode a status information of the package, namely indicating whether the package is still intact or has already been opened. Any suitable code can be used to encode the respective information. Preferably, the code is formed by dot-like sub-pattern formed by the second areas, which dots can selectively be connected by lines, the lines also being formed by the second areas. The first area can serve as background area on which the dots and lines are located.

The inventive package for tobacco products or tobacco related commodities or smoking devices, which is referred to below for sake of convenience often simply as "package" or "packaging", provides a number of advantages. As described below in detail, the information encoding pattern of the above-mentioned type can serve both as an authenticity feature and a seal. Further, the information encoding pattern can easily be detected by means of a common capacitive touch screen, which forms part of a standard smartphone or tablet computer. By means of a simple application on the smartphone or tablet computer, the information encoded in the information encoding pattern can be decoded, output and/or transmitted to an external server, which in turn can provide supplementary data dependent on the decoded information. In other words, the packaging according to the present invention, in addition to be forgery-proof, represents an interactive packaging that supports both automatic authenticity testing and consumer communication. Still further, compared to e.g. an RFID tag, the information encoding pattern can be produced at low cost, as described below, e.g. by printing a conductive ink onto a non-conductive portion of the packaging.

According to an embodiment, the first area forms part of the package and is formed from a first material having a first dielectric property. The information encoding pattern is then formed by said first area and the at least one second area, which second area is generally located in or adjacent to the first area, and is formed from a second material having a second dielectric property that is different from the first dielectric property.

Alternatively, the first area forms part of the package and is formed from a first material having a first conductive property. In this case, the information encoding pattern is formed by said first area and the at least one second area, which is again located in or adjacent to said first area, and is formed from a second material having a second conductive property that is different from the first conductive property.

According to a preferred variant of the latter alternative, the first material forming the first area is non-conductive and the at least one second area is formed by selectively applying, preferably printing, a conductive material, preferably a conductive ink, on or adjacent to the first area in order to form the information encoding pattern. It is also possible that the first material forming part of the package is conductive and that the second material forming the second area is non-conductive.

However, first and second areas forming the information encoding pattern can also be provided separate from the package, e.g. in the form of a label that is then applied, in particular adhered, to the packaging. In this case, the label substrate, e.g. paper or plastic, can form the first area. The second areas can then be applied, e.g. printed, to the label in order to form the information encoding pattern.

Conductive materials include metals or metal particles, materials, e.g. ink, varnish or foil, that comprise conductive particles, such as carbon black, or metal or graphite particles, or conductive polymers.

According to an embodiment, the information encoding pattern is not visible to the naked eye. This, on the one hand, further improves protection against forgery. On the other hand, the optical appearance of the package is not impaired by the information encoding pattern. In order to form such an invisible information encoding pattern, transparent conductive ink can be used.

According to an embodiment, the information encoding pattern is arranged on the package so that the information encoding pattern is at least partially destroyed if the package is opened. In this way, the information encoding pattern, while the package is still closed, can serve as an authenticity feature and in order to trigger a consumer communication method described below. The information encoding pattern can further, indirectly, serve as a seal. If the information encoding pattern is destroyed by opening the package, detecting the information encoding pattern by the touch screen, and in particular, decoding information originally encoded in the information encoding pattern, will fail. This failure indirectly indicates that the package is no longer intact, but has been tampered with or opened. In order to provide the respective function, the information encoding pattern is preferably located at an interface between a first and a second portion of the package, which first and second portion are displaced relative to each other if the package is opened.

According to a preferred variant of the above embodiment, the information encoding pattern is arranged on the package so that at least part of the information encoding pattern is still detectable by the capacitive touch screen, and the information encoded in this at least one part is still decodable by a respective reader device including the touch screen, after the package has been opened. This variant has the advantage that the information encoding pattern can still serve as an authenticity feature and in order to support an automatic consumer communication method, even if the package has already been opened. This is possible, if the respective information is encoded in the at least one part of the information encoding pattern that remains intact while opening the packaging. In order to further function as a seal, the information encoding pattern can, in a second part that is at least partly destroyed if the package is opened, encode a status information indicating that the package is intact. This status information can no longer be decoded after the packaging has been opened.

The package for tobacco products or tobacco related commodities or smoking devices can be formed in different dimensions and from different materials. According to one embodiment, the packaging is a carton or paper based box or packet, such as a cigarette hard pack or a cigarette soft pack. Optionally, a respective packet or box can include an inner liner, e.g. for flavor preservation. The inner liner can e.g. comprise an aluminum foil laminate. Alternatively or additionally, the packet or box can comprise an outer wrapper, e.g. for flavor and/or moisture preservation. The outer wrapper may e.g. comprise a plastic film or foil. According to a specific embodiment, a paper or carton based package is formed as container including a plurality of the above mentioned boxes or packets. Such a container can e.g. be formed by a paper based wrapper holding together the plurality of boxes or packs.

These types of packaging generally serve to store tobacco products such as cigarettes, small cigars, and cigars. Cigars can also be stored in wooden boxes, optionally including an inner liner and/or an outer wrapper.

Further, paper or carton based package can be used to store smokeable or non-smokeable tobacco related commodities, such as cigarette paper, filters, tubes or filter tubes for cigarettes. Cigarette papers can also be stored in paper or carton based booklets.

According to another embodiment, the package can be formed as a tin or can or canister or box, preferably formed from metal and/or plastic. Such a tin, can, or box can comprise an opening that can be closed by means of a lid or a cover. A lid can e.g. be connected to the tin or box by means of a hinge. Alternatively, a cover can be provided as screw cap, a cap to be simply put on or plugged in, or the like.

These types of package generally serve to store tobacco products such a loose roll your own tobacco or smokeless tobacco, such as chewing tobacco, dipping tobacco, dissolvable tobacco, snus, or snuff. Also electronic or non-electronic smoking devices, such as electronic cigarettes or aerosol-generating devices, are preferably stored in these types of packages.

According to still another embodiment, the package can be formed as a pouch, preferably formed from plastic or foil lined paper. Again, an outer wrapper of foil or the like is optional.

Also this type of package can serve to store tobacco products such a loose roll your own tobacco or smokeless tobacco.

According to a second aspect, a method of producing a package for tobacco products or tobacco related commodities or smoking devices is provided. In a first step, a packaging that is configured to store tobacco products, tobacco related commodities, or smoking devices is provided. In a further step, an information encoding pattern is provided on the packaging. The information encoding pattern comprises at least one first area having a first conductive or dielectric property and at least one second area having a second conductive or dielectric property. The first conductive property is different from the second conductive property and the first dielectric property is different from the second dielectric property. The information encoding pattern is configured to be detectable by a capacitive touch screen when the information encoding pattern interacts with the touch screen, as already described above in detail.

Preferably, the first area forms part of the package and is formed from a first material. This first material has a first dielectric or conductive property. A second material is then used to form the at least one second area, preferably by applying the second material to the first area. The second material has a second dielectric property that differs from the first dielectric property or has a second conductive property that differs from the first conductive property.

According to a preferred embodiment, in order to form the information encoding pattern on the package, a portion of the packaging that is formed from a non-conductive material serves as the first area onto which a second conductive material is applied, preferably printed, in order to form the second areas.

According to a further preferred variant, the information encoding pattern is provided on the packaging so that the information encoding pattern is at least partially destroyed if the package is opened.

The method can further comprise the step of filling the packaging with tobacco products and the step of closing the packaging.

The order of the above mentioned method steps can vary, depending on the type of packaging, the type of information encoding pattern, and the manner in which the information encoding pattern is applied to the package. In some cases, the information encoding pattern is not applied to the packaging before the packaging is filled with tobacco products and is closed. In other cases, first the information encoding pattern is applied to a portion of the packaging before the packing is filled and closed.

According to a third aspect, there is provided a system including a package for tobacco products or tobacco related commodities or smoking devices according to the first aspect and a reader device including a capacitive touch screen, preferably in the form of a mobile device, such as a smartphone or a tablet computer. The reader device is configured to detect the information encoding pattern of the package, by means of the capacitive touch screen, when the information encoding pattern interacts with the touch screen, i.e. when the information encoding pattern approaches and/or touches the touch screen. The reader device is further configured to decode information encoded in the information encoding pattern. To that end, a suitable application can be installed in the reader device. Still further, the reader device is preferably configured to output at least part of the decoded information. A respective output signal can e.g. be displayed, i.e. output as a visual signal. Alternatively or additionally, an output signal can be output in the form of an audible signal or a signal that is tactilely perceptible.

According to an embodiment, the system can further comprise an external server that is connected to the reader device via a communication network. The external server can be hosted by a manufacturer or vendor of the package for tobacco products or tobacco related commodities or smoking devices. The reader device in this case is configured to transmit at least part of the decoded information to the external server. The external server in turn is configured to process the decoded information, in particular to store the respective information in one or more databases and/or to analyze this type of information with respect to a plurality of package of the same or similar kind.

The external server can further be configured to provide supplementary data relating to the package dependent on the decoded information received from the reader device. In general, the supplementary data depend on a status information (directly or indirectly indicating whether the package is intact or has been opened) and/or on an identification information uniquely identifying the package. The reader device is then configured to process the supplementary data, i.e. store and/or output and/or execute, the supplementary data.

According to a first variant, the supplementary data can comprise an authenticity information regarding the authenticity or genuineness of the package. In this way, a consumer can be informed whether the package is genuine or a fake.

According to a second variant, the supplementary data can comprise product information with respect to the package. This allows providing additional information about the tobacco product and/or similar products, which information can e.g. not be printed to the package due to space constraints.

According to a third variant, the supplementary data can comprise advertising.

According to a fourth variant, the supplementary data can comprise the possibility to directly reorder a package of the present kind or to comment on the tobacco product, e.g. on an internet site.

According to an embodiment, the type and/or amount of supplementary data provided by the external server can depend on whether or not a status information indicates an already opened package. In particular, according to an embodiment, the external server is configured to provide at least part of the supplementary data only in case the decoded information received from the reader device includes a status information that indicates that the package in no longer intact, but has already been opened. In this case, a consumer cannot get the supplementary data before the tobacco product package has been opened.

Typical supplementary data that is only provided after the package has been opened is e.g. bonus material and/or extra features, such as bonus points, discounts, or computer games. But also the possibility to comment on the tobacco product and/or the possibility to directly reorder the tobacco product may only be provided under these specific circumstances.

According to a fourth aspect, a consumer communication method is provided. This method uses the elements of the system according to the third aspect for the purposes already described above with respect to the system.

The method comprises the steps of providing a package for tobacco products or tobacco related commodities or smoking devices according to the first aspect, detecting the information encoding pattern of the package, by means of a capacitive touch screen of a reader device, when the information encoding pattern interacts with the touch screen, decoding information encoded in the information encoding pattern, and preferably outputting at least part of the decoded information by the reader device.

The consumer communication method can further comprise the steps of transmitting, by the reader device, at least part of the decoded information to an external server, via a suitable communication network, such as the internet or a telecommunication network, and processing this information by the external server.

According to an embodiment, the consumer communication method further comprises the steps of providing supplementary data relating to the package to the reader device dependent on the decoded information received from the reader device, and processing the supplementary data by the reader device.

According to a further embodiment, at least part of the supplementary data is only provided in case a status information included in the decoded information indicates that the package has been opened.

The characteristics, features and advantages of this invention and the manner in which they are obtained as described above, will become more apparent and be more clearly understood in connection with the following description of exemplary embodiments, which are explained with reference to the accompanying drawings.

In the drawings, same element numbers indicate same elements in each of the views:

FIG. 1 is a schematic illustration of an exemplary information encoding pattern;

FIG. 3 illustrates a package for tobacco products or tobacco related commodities or smoking devices according to a second embodiment in perspective view;

FIGS. 4A and 4B illustrate a package for tobacco products or tobacco related commodities or smoking devices according to a third embodiment in perspective view, both in a closed state (FIG. 4A) and in an opened state (FIG. 4B);

Figure 6:
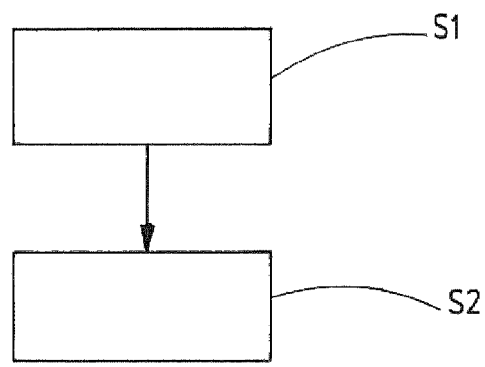
Figure 7:
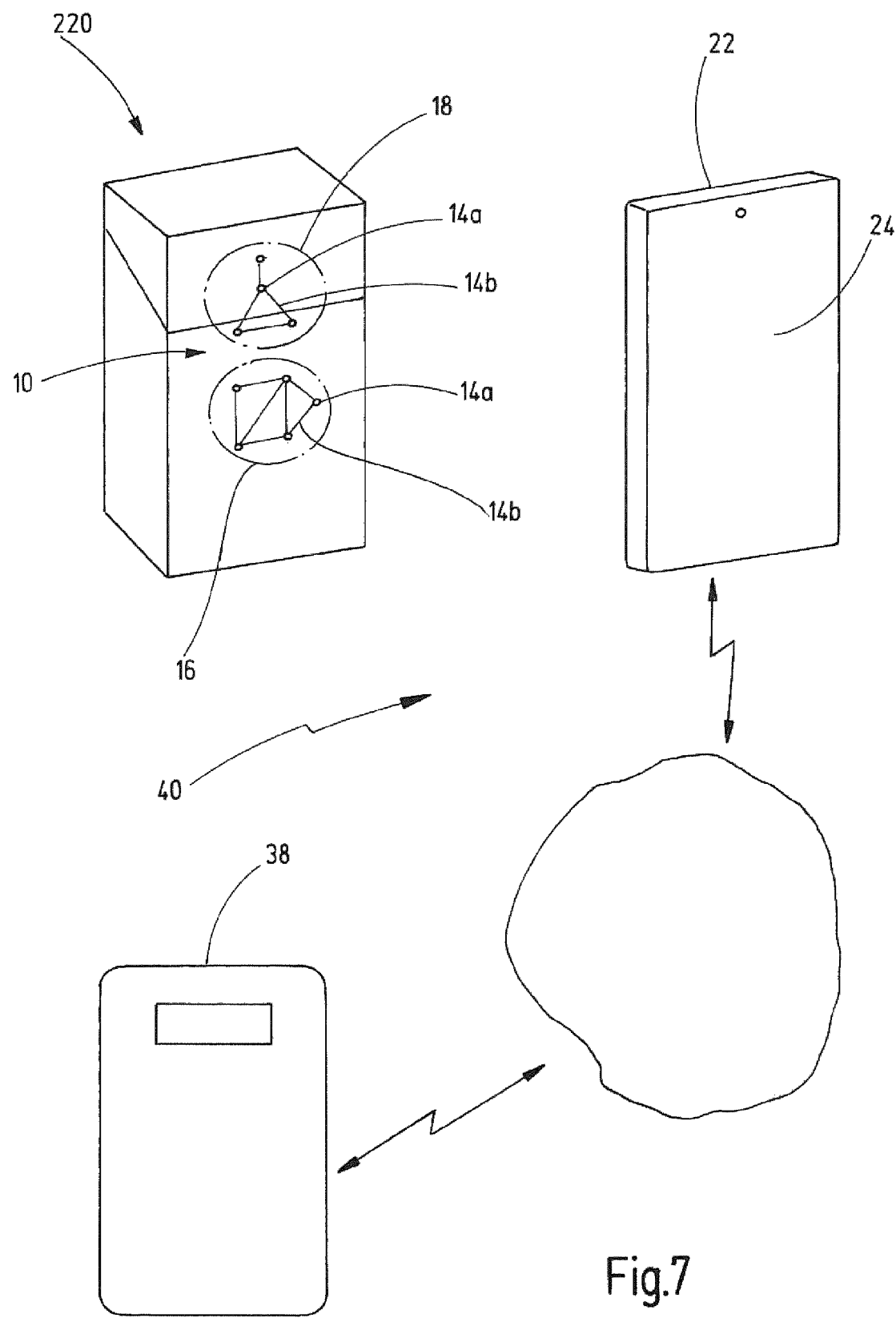

FIG. 6 schematically illustrates steps of a method of producing a package for tobacco products or tobacco related commodities or smoking devices;

FIG. 7 shows components of a system including the package of FIG. 4; and

Figure 8:
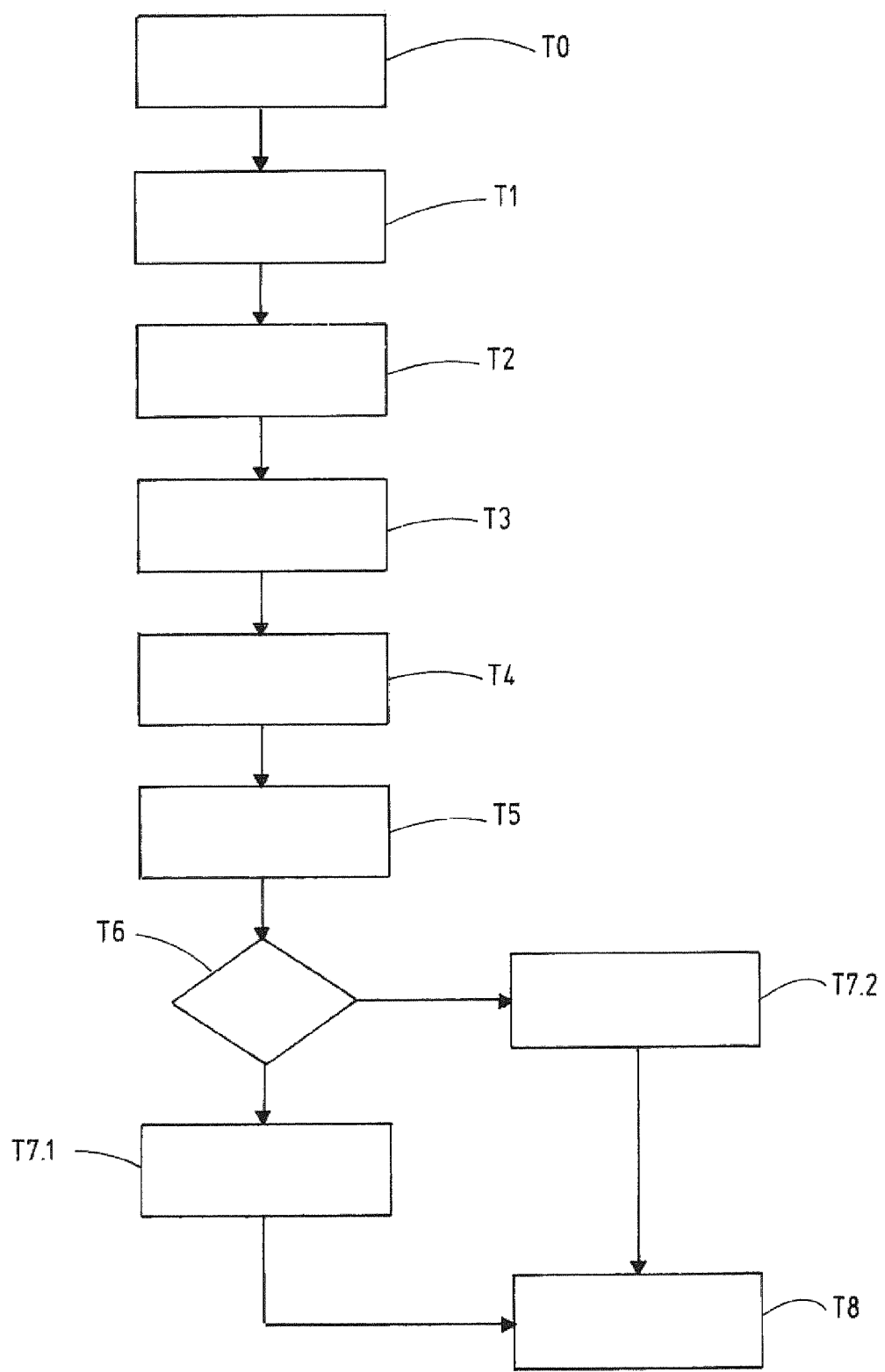

FIG. 8 schematically illustrates steps of a consumer communication method with respect to a package according to any one of the embodiments shown in FIGS. 2 to 5 using the system of FIG. 7.

In FIG. 1, an information encoding pattern 10 is schematically illustrated. A first area 12 serves as a background, on which a plurality of second areas 14a, 14b, 14c are arranged. The first area 12 together with the second areas 14 form the information encoding pattern 10. In the example shown, the first area 12 corresponds to a portion of a package for tobacco products or tobacco related commodities or smoking devices (cf. FIGS. 2 to 5). Alternatively, the first area 12 may also be formed from a separate substrate, e.g. paper of plastic, which is configured to be arranged on a package, e.g. by means of a suitable adhesive or by means of a transfer process.

The first area 12 is formed from a material that is non-conductive. The second areas 14a, 14b, 14c are formed from conductive ink that is printed to the first area. Any other conductive material and/or process can alternatively be used to form the second areas 14.

In general, the first area 12 has a first conductive property and the second areas have a second conductive property that differs from the first conductive property. Alternatively, the first area 12 has a first dielectric property and the second areas have a second dielectric property that differs from the first dielectric property.

The second areas 14 in the example include dots 14a that are selectively connected by lines 14b. The specific arrangement of the dots 14a and lines 14b, in particular the number and relative position of dots 14a with respect to each other can be used to encode information according to any suitable code. Needless to say that the number and relative position of the dots 14a can vary, as well as the number and arrangement of the lines 14b, which essentially serve to conductively connect certain sub-groups of dots 14a. Instead of dots 14a, alternative geometric shapes, such as squares, triangle, or any other regular or irregular shape can be used in order to form second areas 14. Further, lines 14b may also be curved and/or may intersect.

The information encoding pattern 10 in the example shown in FIG. 1 includes two separable parts 16, 18, which are used to encode specific types of information, as set forth below in detail with reference to FIG. 4A, 4B. In the first part 16, an identification information uniquely identifying a package, is encoded. In the second part, a status information indicating whether the package is intact or has been opened is encoded. The number of parts of the information encoding pattern that encode different types of information, can vary, as well as the specific type of information that is encoded in one of these parts.

Optional coupling areas 14c are connected by lines 14b to the remaining lines 14b and dots 14a. These areas 14c are generally arranged on a respective package in such a way that a consumer holding the packaging contacts the areas 14, e.g. with his fingers. In case of a conductive second material forming the second areas 14, these coupling areas 14c serve to ensure that the remaining second areas' 14a, 14b potential is set to the consumer's potential. The areas 14c can be replaced by a number of potentially crossing lines 14b, which lines extend in a respective portion of the packaging. For convenience, the optional coupling areas 14c have been omitted in FIGS. 2 to 5.

As described below with reference to FIG. 2A, 2B, the information encoding pattern 10 is configured to be detected by a capacitive touch screen when the information encoding pattern interacts with the touch screen, i.e. when the information encoding pattern 10 approaches and/or touches the touch screen.

Figure 2A:
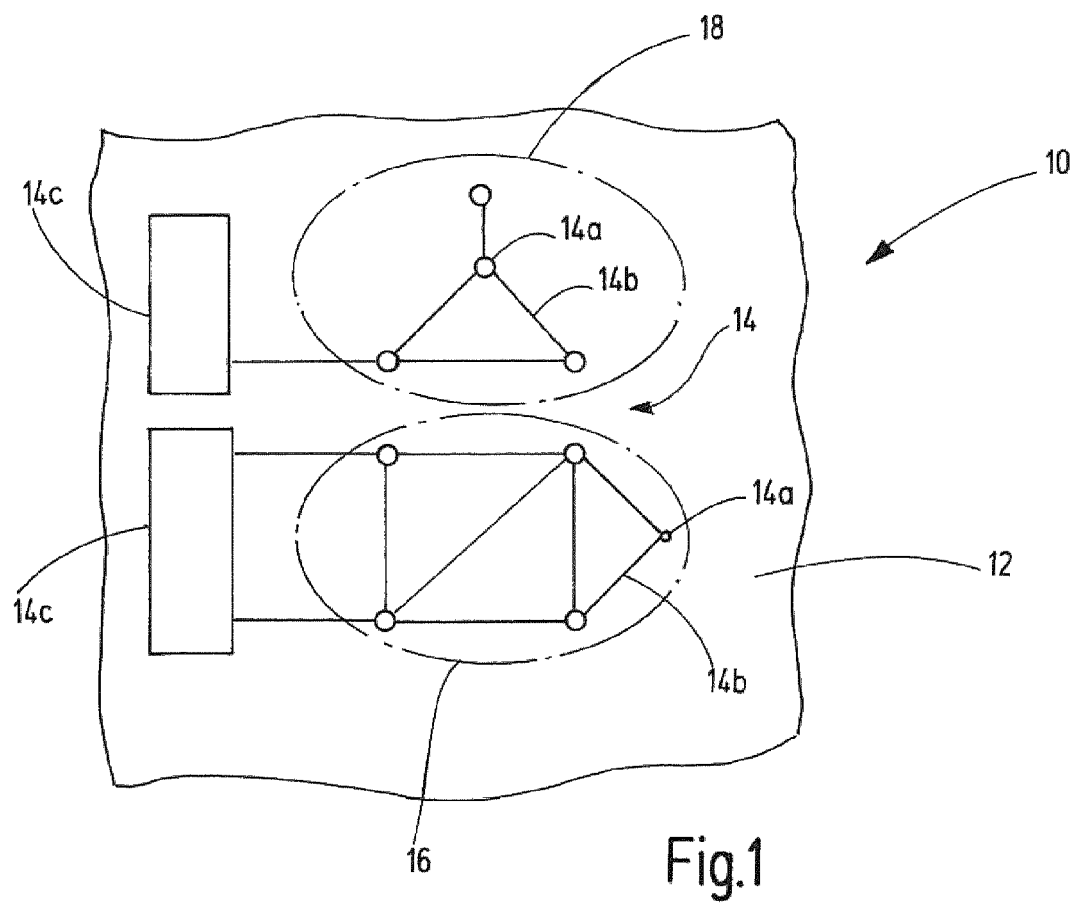
FIG. 2A illustrates a package for tobacco products or tobacco related commodities or smoking devices according to a first embodiment in perspective view.
Figure 2B:
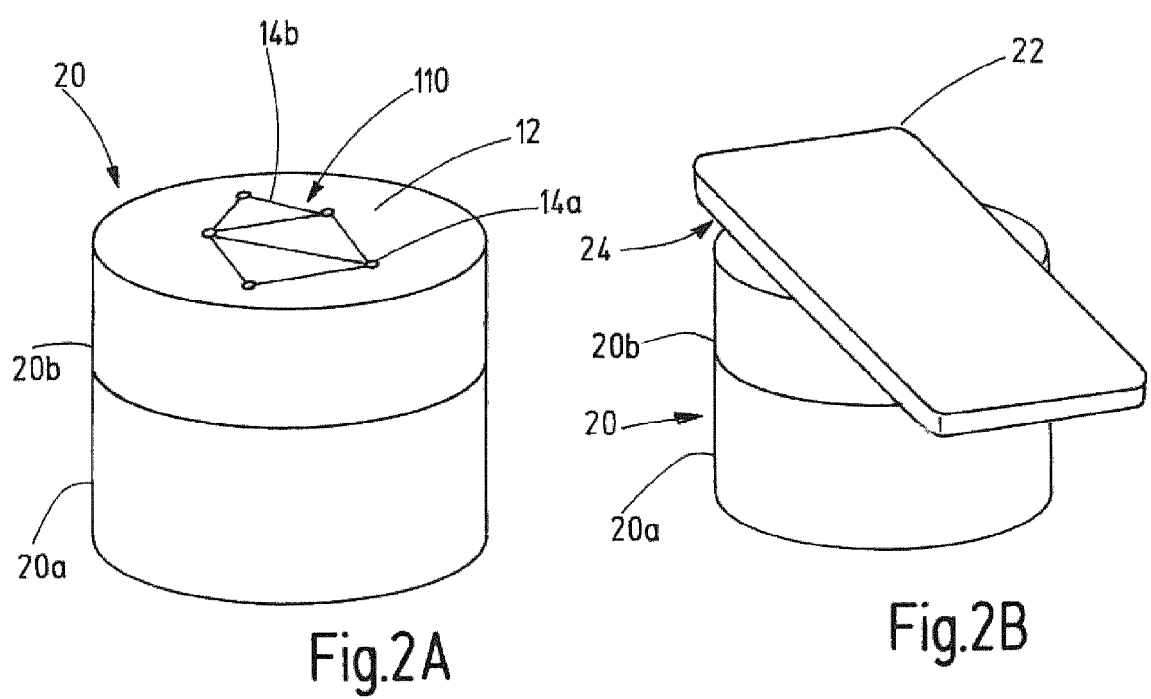
FIG. 2B illustrates a step of detecting the information encoding pattern of the packaging of FIG. 2A by means of a capacitive touch screen.

FIG. 2A illustrates a first embodiment of a package for tobacco products or tobacco related commodities or smoking devices 20 in perspective view. FIG. 2B illustrates a step of detecting the information encoding pattern 10 on the packaging 20 of FIG. 2A by means of a capacitive touch screen 24 of a reader device 22, such as a smartphone.

The package 20 is provided in the form of a can including a base portion 20a, which is reclosable by means of a cover 20b. The cover 20b can simply be put or plugged on the base portion 20a or can be provided as a screwed cap. The can 20 can e.g. serve to store any kind of smokeless tobacco, such as chewing tobacco, dipping tobacco, dissolvable tobacco, snus, or snuff.

On top of the can 20, an information encoding pattern 110 is arranged. The cover 20b serves as the first area 12, the dots 14a and lines 14b form the second areas 14. The information encoding pattern 110, which essentially corresponds to the first part 16 of the information encoding pattern 10 of FIG. 1, can be detected by means of a touch screen 24 of a reader device 22, such as a smartphone, as illustrated in FIG. 2B. To this end, the information encoding pattern 110 is touched by the touch screen 24. The touch screen 24 senses the second areas 14 due to the differences in conductivity with respect to the non-conductive first area 12.

The smartphone 22 includes an application that is configured to decode the information encoded in the pattern 110. At least part of this decoded information can be output, e.g. displayed, by the reader device 22, and/or can be transmitted to further instances, as described below in detail with respect to FIGS. 7 and 8.

FIG. 3 illustrates a package for tobacco products or tobacco related commodities or smoking devices 120 according to a second embodiment in perspective view. The packaging 120 is formed as a pouch 29 enclosed by an outer wrapper 30 from plastic foil. Such a packaging 120 can e.g. store loose tobacco, such as smokable loose roll your own tobacco. Onto the outer wrapper 30, the information encoding pattern 110 is applied in such a manner that, if the wrapper 30 is opened by tearing of the tear tape 32 of the outer wrapper 30, the the information encoding pattern 110 is destroyed. In other words, the information encoding pattern 110 can only be detected, and in particular the information encoded therein can only be decoded, as long as the package 120 is intact. As soon as the packaging is opened, the wrapper 30 including the information encoding pattern 110 is destroyed.

However, even in this case, the information encoding pattern 110 can be used as authenticity feature, as long as the packaging 120 is intact. The information encoding pattern 110 can store an identification information, which can be used to authenticate the packaging 120. In case a detection of the information encoding pattern 110 fails, due to a destroyed outer wrapper 30, a consumer can still indirectly infer that the package 120 is no longer intact but has already been opened. In other words, the information encoding pattern 110, arranged in the above described manner, can also serve as a seal.

FIGS. 4A and 4B illustrate a package for tobacco products or tobacco related commodities or smoking devices 220 according to a third embodiment in perspective view, both in a closed state (FIG. 4A) and in an opened state (FIG. 4B).

The package 220 is formed as a generally known cigarette hard box, i.e. carton box with a hinged lid 26. The cigarettes inside the box are further enclosed by an inner liner 28 (cf. FIG. 4B) from an aluminum foil laminate. Optionally (not shown), an outer wrapper, e.g. a plastic foil, can be provided.

An information encoding pattern 10 according to FIG. 1 is applied to the front side of the carton box in such a way that the second part 18 is destroyed if the box is opened by opening up the hinged lid 26, as shown in FIG. 4B. In general, as exemplary described above with respect to FIG. 3, an information encoding pattern 10 can be provided on a package in such a way that the information encoding pattern 10 is arranged at an interface between a first and a second portion of the packaging, which first and second portion are displaced relative to each other if the packaging is opened—thereby destroying at least part of the information encoding pattern.

In contrast to the embodiment described with reference to FIG. 3, the information encoding pattern 10 is not completely destroyed if the box 220 is opened. After opening the box 220 the first part 16 of the information encoding pattern 11, encoding e.g. an identification information, is still intact, and can consequently be used in order to check the authenticity of the package 220, before and after opening same.

Only the second part 18 of the information encoding pattern 10 is destroyed by opening the packaging 220, as shown in FIG. 4B. As long as the packaging is intact, the second part 18 can be detected and the information encoded therein, e.g. a status information indicating whether the package is intact or has been opened, can be decoded. In case the second part can no longer be detected, or the information encoded in the second part can no longer be decoded, the consumer can indirectly infer that the packaging has already been opened.

According to a preferred variant, the sub-pattern 18a of the first pattern 18 (cf. FIG. 4B), in absence of the second sub-pattern 18b, can encode the fact that the packaging has been destroyed. Even closing the hinged lid 26 would not restore the original second part of the information encoding pattern 10, because the lines 14b connecting the first sub-pattern 18a with the second sub-pattern 18b, remain broken, which fact can generally be sensed by the touch screen 24.

Figure 5:
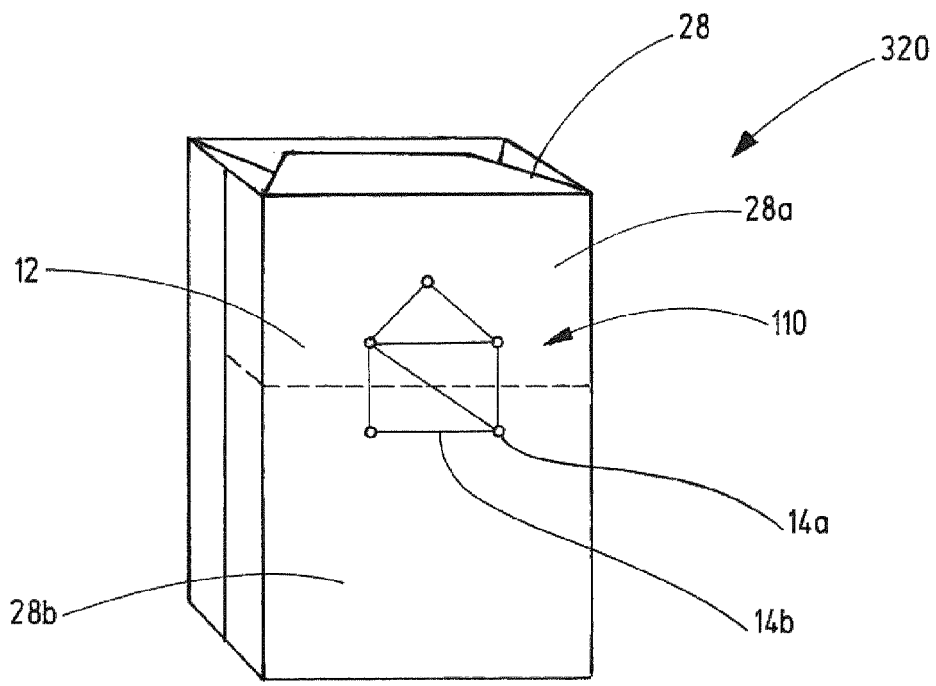
FIG. 5 illustrates a package for tobacco products or tobacco related commodities or smoking devices according to a fourth embodiment in perspective view.

FIG. 5 illustrates a package for tobacco products or tobacco related commodities or smoking devices 320 according to a fourth embodiment in perspective view. According to this embodiment, an information encoding pattern 110 has been applied to the inner liner 28 of a cigarette hard box, at an interface between a pull tab 28a and a remaining portion 28b of the liner 28. When tearing off the pull tab 28a, the information encoding pattern 110 is destroyed. This embodiment is functionally comparable to the embodiment of FIG. 3.

FIG. 6 schematically illustrates steps of a method of producing a package for tobacco products or tobacco related commodities or smoking devices, e.g. a packaging according to any one of the above described embodiments.

In step S1, a packaging 20, 120, 220, 320 that is configured to store tobacco products is provided, e.g. a carton box (cf. FIG. 4), a laminated liner (cf. FIG. 5), a can (cf. FIG. 2), or a pouch (cf. FIG. 3). In a further step S2, an information encoding pattern 10 is provided on the packaging as described above. The information encoding pattern 10 comprises at least one first area 12 having a first conductive or dielectric property and at least one second area 14 having a second conductive or dielectric property. The first conductive property is different from the second conductive property and the first dielectric property is different from the second dielectric property. The information encoding pattern 10 is configured to be detectable by a capacitive touch screen 24 of a reading device 22 when the information encoding pattern 10 interacts with the touch screen 24.

According to a preferred embodiment, a non-conductive portion of the packaging 20 serves a the first area, onto which the second areas are printed by means of a conductive ink.

FIG. 7 shows components of a system including the package of FIG. 4. The system can alternatively or additionally comprise a package according to any of the above-described embodiments. The system 40 further comprises at least one reader device 22, preferably in the form of a mobile device, such as a smartphone, a tablet computer, etc. The reader device 22 includes a capacitive touch screen 24 that is configured to detect an information encoding pattern 10 of the package 220, as described in detail above with reference to FIGS. 1, 2, and 4. The reader device 22 is further configured to decode information encoded in the detected information encoding pattern 10. Preferably, the reader device 22 can also output at least part of the decoded information, e.g. a status signal in line with a status information indication whether the packaging 220 is still intact or has been opened. As mentioned above, such a status information can e.g. be encoded in a part 18 of the information encoding pattern 10.

The system 40 can further comprise an external server 38 that is connected to the reader device 22 via a communication network 36, such as the internet. The reader device 22 is configured to transmit at least part of the decoded information to the external server 38, which is configured to process this information.

The external server 38, which can be hosted by a manufacturer or vendor of the package 220, is configured to provide supplementary data relating to the package 220 to the reader device 22, dependent on the information received from the reader device 22. The reader device 22 is configured to process, e.g. to store, display, and/or execute, the supplementary data.

As described below in detail with reference to FIG. 8, the external server 38 can be configured to provide at least part of the supplementary data only in case the information received from the reader device 22 indicates that the package 220 has already been opened.

The system 40 shown in FIG. 7 can serve to support a consumer communication method, which method is described below with reference to FIG. 8.

In a first step T0, a package for tobacco products or tobacco related commodities or smoking devices 220 is provided. In step T1, the information encoding pattern 10 of the packaging 220 is detected by means of the touch screen 24 of the reader device 22. In step T2, information encoded in the information encoding pattern 10, e.g. an identification information and a status information, which information can respectively be encoded in the first part 16 and the second part 18 of the information encoding pattern 10, is decoded by the reader device 22.

In step T3, the reader device 22 can output at least part of the decoded information in a suitable manner. The reader device can e.g., based on the status information encoded in the information encoding pattern, output a status signal indicating whether or not the package has already been opened. A consumer, in this way, can simply and reliably check whether or not the package is intact.

According to a first variant, the method can stop at this stage. According to another variant, the step of outputting part of the decoded information can be omitted, e.g. in case the information encoding pattern 110 does neither directly nor indirectly encode a status information in the above-described sense, as it is e.g. the case in the embodiment shown in FIG. 2A.

According to a preferred variant, further steps follow, irrespective of omitting step S3 or not, as set forth below.

In step T4, the reader device 22 transmits at least part of the decoded information, e.g. the identification information and the status information, to the external server 38 via the communication network 36. The respective information is processed by the external server 38 in step T5. Processing this information can include storing/and or analyzing this information. Also at this stage, the method, according to a further variant, can stop.

According to a preferred variant, supplementary data relating to the package 220 are provided to the reader device 22 by the external server 38, dependent on the information received in step T4, in particular dependent on the status information and/or the identification information. In step T6, the external server analyzes the information received from the reader device 22, in particular in case a status information has been received, this status information indicating whether or not the package 220 has already been opened.

In the affirmative, as illustrated with respect to step T7.2, a first set of supplementary data is provided to the reader device 22. This data can, on the one hand, and independent from the status information, include authenticity information and/or identification information with respect to the specific packaging 220, based on the identification information read by the reader device 22. On the other hand, the supplementary data can include bonus material for the consumer who has bought and opened the packaging 220, such as discount on further orders, computer games, and the like.

In case, however, the external device 38 in step T6 finds out, by analyzing the received information, that the product packaging 220 is still intact, in step T7.1 as supplementary data only provides the authenticity information and the general product information, but no bonus material. According to a variant, step T7.1 can also be omitted in this case, i.e. no supplementary data are provided.

In step T8, the reader device 22 processes the received supplementary data, e.g. displays the authenticity information and the general product information. Bonus material, if received, can be processed in any suitable manner.

LIST OF REFERENCE SIGNS

10, 110 information encoding pattern
12 first area
14 second areas
14a, 14b, 14c elements forming the second areas
16 first part of the information encoding area
18 second part of the information encoding area
18a, 18b sub-pattern of the second part
20, 120, 220, 320 package for tobacco products or tobacco related commodities or smoking devices
20a can base portion
20b cover
22 reader device
24 capacitive touch screen
26 hinged lid
28 inner liner
28a pull tab of inner liner
28b remaining part of inner liner
29 pouch
30 outer wrapper
32 tear tape
36 communication network
38 external server
40 system
S1, S2 steps of a method of producing a package for tobacco products or tobacco related commodities or smoking devices
T0 to T8 steps of a consumer communication method

The invention claimed is:

1. A package for tobacco products or tobacco related commodities or smoking devices, wherein the package includes an information encoding pattern, wherein the information encoding pattern comprises at least one first area having a first conductive or dielectric property and at least one second area having a second conductive or dielectric property, the first conductive property being different from the second conductive property and the first dielectric property being different from the second dielectric property, wherein the information encoding pattern is configured to be detectable by a capacitive touch screen when the information encoding pattern interacts with the touch screen, wherein
  the information encoding pattern encodes an identifier uniquely identifying the package and a status information of the package indicating whether the package is intact or has been opened,
  the information encoding pattern includes a first part encoding an identification information and a second part encoding a status information indicating whether the package is intact or has been opened,
  the second part includes a first sub-pattern and a second sub-pattern connected together by conductive lines, and
  the first sub-pattern, in absence of the second sub-pattern being detected as conductively connected to the first sub-pattern by the capacitive touch screen, is configured to encode the fact that the package has been opened.

2. The package according to claim 1,
  wherein the first area forms part of the package and is formed from a first material having a first dielectric property and wherein the information encoding pattern is formed by said first area and the at least one second area that is formed from a second material having a second dielectric property different from the first dielectric property, or
  wherein the first area forms part of the package and is formed from a first material having a first conductive property and wherein the information encoding pattern is formed by said first area and the at least one second area that is formed from a second material having a second conductive property different from the first conductive property.

3. The package according to claim 2, wherein the first material forming the first area is non-conductive and wherein the at least one second area is formed by selectively applying a conductive material on the first area.

4. The package according to claim 1, wherein the information encoding pattern is arranged on the package so that the information encoding pattern is at least partially destroyed if the package is opened.

5. The package according to claim 4, wherein the information encoding pattern is arranged on the package so that the first at least part of the information encoding pattern is still detectable by the capacitive touch screen after the package has been opened.

6. The package according to claim 1,
wherein the package is
a carton or paper based box or packet or booklet, optionally including an inner liner and/or an outer wrapper, or a container including a plurality of such boxes or packets or booklets; or
a tin or can or canister; or
a pouch.

7. The package according to claim 1,
wherein the package includes
tobacco products in the form of:
smokable tobacco products, cigarettes, small cigars, cigars, or loose tobacco, or
smokeless tobacco, such as chewing tobacco, dipping tobacco, dissolvable tobacco, snus, or snuff,
or wherein the package includes
smokeable or non-smokeable tobacco related commodities, cigarette paper, filters, tubes or filter tubes for cigarettes,
or wherein the package includes
electronic or non-electronic smoking devices, electronic cigarettes or aerosol-generating devices.

8. A method of producing a package for tobacco products or tobacco related commodities or smoking devices, the method comprising:
providing a package that is configured to store tobacco products or tobacco related commodities or smoking devices; and
providing an information encoding pattern on the package, wherein the information encoding pattern comprises at least one first area having a first conductive or dielectric property and at least one second area having a second conductive or dielectric property, the first conductive property being different from the second conductive property and the first dielectric property being different from the second dielectric property, wherein the information encoding pattern is configured to be detectable by a capacitive touch screen when the information encoding pattern interacts with the touch screen,
wherein
the information encoding pattern encodes an identifier uniquely identifying the package and a status information of the package indicating whether the package is intact or has been opened,
the information encoding pattern includes a first part encoding an identification information and a second part encoding a status information indicating whether the package is intact or has been opened,
the second part includes a first sub-pattern and a second sub-pattern connected together by conductive lines, and
the first sub-pattern, in absence of the second sub-pattern being detected as conductively connected to the first sub-pattern by the capacitive touch screen, is configured to encode the fact that the package has been opened.

9. A system comprising:
the package for tobacco products or tobacco related commodities or smoking devices according to claim 1;
a reader device including a capacitive touch screen, in the form of a mobile device, wherein the reader device is configured
to detect the information encoding pattern of the package, by means of the capacitive touch screen, when the information encoding pattern interacts with the touch screen,
to decode information encoded in the information encoding pattern, and
to output decoded information.

10. The system according to claim 9, further comprising an external server that is connected to the reader device via a communication network, wherein the reader device is configured to transmit at least part of the decoded information to the external server, which external server is configured to process the decoded information.

11. The system according to claim 10, wherein the external server is configured to provide supplementary data relating to the package dependent on the decoded information, and wherein the reader device is configured to process the supplementary data.

12. A consumer communication method, comprising the steps of:
providing the package for tobacco products or tobacco related commodities or smoking devices according to claim 1;
detecting the information encoding pattern of the package, by means of a capacitive touch screen of a reader device, when the information encoding pattern interacts with the touch screen,
decoding information encoded in the information encoding pattern.

13. The consumer communication method according to claim 12, further comprising the steps of:
transmitting, by the reader device, decoded information to an external server and
processing the decoded information by the external server.

14. The consumer communication method according to claim 13, further comprising the steps of:
providing supplementary data relating to the package to the reader device dependent on the decoded information; and
processing the supplementary data by the reader device.

15. The consumer communication method according to claim 14, wherein at least part of the supplementary data is only provided in case the decoded information indicates that the package has already been opened.

* * * * *